United States Patent [19]

Minor et al.

[11] Patent Number: 5,762,818
[45] Date of Patent: Jun. 9, 1998

[54] COMPOSITIONS WHICH INCLUDE 1,1,2,2-TETRAFLUOROETHANE AND FLUOROETHANE

[75] Inventors: Barbara Haviland Minor, Elkton, Md.; Donna Marie Patron, Newark, Del.; Diana Lynn Klug, Wilmington, Del.; Brooks Shawn Lunger, Newark, Del.

[73] Assignee: E. I. du Pont de Nemours and Company, Wilmington, Del.

[21] Appl. No.: 842,165

[22] Filed: Apr. 23, 1997

Related U.S. Application Data

[60] Division of Ser. No. 748,119, Nov. 12, 1996, which is a continuation-in-part of Ser. No. 192,908, Feb. 7, 1994, abandoned, which is a continuation-in-part of Ser. No. 89,004, Jul. 9, 1993, abandoned, which is a continuation-in-part of Ser. No. 913,642, Jul. 15, 1992, abandoned.

[51] Int. Cl.$^6$ .............................. C09K 5/04; C11D 7/30; C08J 9/14; B29C 67/20
[52] U.S. Cl. .............................. 252/67; 521/131; 521/98; 521/910; 510/177; 510/408; 134/40; 134/42; 134/38; 62/114; 62/324.1; 264/53; 264/DIG. 5
[58] Field of Search .............................. 252/67; 521/131, 521/98, 910; 510/177, 408; 134/40, 42, 38; 62/114, 324.1; 264/53, DIG. 5

[56] References Cited

U.S. PATENT DOCUMENTS

| | | | |
|---|---|---|---|
| 2,697,726 | 12/1954 | Silvey et al. | 252/67 |
| 4,315,098 | 2/1982 | Dougherty et al. | 114/155 |
| 4,482,465 | 11/1984 | Gray | 252/67 |
| 4,944,890 | 7/1990 | Deeb et al. | 252/54 |
| 5,001,287 | 3/1991 | Fernandez et al. | 570/178 |
| 5,182,040 | 1/1993 | Bartlett | 252/67 |
| 5,187,206 | 2/1993 | Volkeit et al. | 521/129 |
| 5,277,834 | 1/1994 | Bivens et al. | 252/67 |
| 5,417,871 | 5/1995 | Minor et al. | 252/67 |
| 5,433,880 | 7/1995 | Minor et al. | 252/67 |
| 5,438,849 | 8/1995 | Yoshida et al. | 252/67 X |
| 5,558,810 | 9/1996 | Minor et al. | 252/67 |
| 5,589,098 | 12/1996 | Shiflett et al. | 252/67 |
| 5,605,882 | 2/1997 | Klug et al. | 510/411 |
| 5,616,276 | 4/1997 | Bivens et al. | 252/67 |

FOREIGN PATENT DOCUMENTS

| | | |
|---|---|---|
| 509673 | 10/1992 | European Pat. Off. . |
| 565265 | 10/1993 | European Pat. Off. . |
| 738772 | 10/1996 | European Pat. Off. . |
| 63-105088 | 5/1988 | Japan . |
| 1-139675 | 6/1989 | Japan . |
| 3-093887 | 4/1991 | Japan . |
| 4-110384 | 4/1992 | Japan . |
| 4110383 | 4/1992 | Japan . |
| 4110385 | 4/1992 | Japan . |
| 5230265 | 9/1993 | Japan . |
| 92/01762 | 2/1992 | WIPO . |
| WO 93/11201 | 6/1993 | WIPO . |
| 94/02563 | 2/1994 | WIPO . |

OTHER PUBLICATIONS

*Research Disclosure*, vol. 146, disclosure No. 14623, Jun. 1976.

Kazachki et al., "Thermodynamic Evaluation of Predicted Fluorinated Ether, EThane, and Propane Azeotropes", *1992 International Refrigeration Conference—Energy Efficiency and New Refrigerants*, vol. II, Jul. 1992, pp. 595–605.

Gage et al., "Predictions of Azeotropes Formed from Fluorinated Ethers, Ethanes and Propanes", *1992 International Refrigeration Conference—Energy Efficiency and New Refrigerants*, vol. II, Jul. 1992, pp. 611–619.

*Primary Examiner*—Douglas J. McGinty

[57] ABSTRACT

Compositions are disclosed which include 1,1,2,2-tetrafluoroethane and a propane, tris(trifluoromethyl)amine, trifluoromethylsulfur pentafluoride or fluoroethane. The term propane includes compounds of the formula $C_3F_aH_{8-a}$ wherein $0 \leq a \leq 8$ as well as cyclic compounds of the formula $C_3F_bH_{6-b}$ wherein $0 \leq b \leq 6$. These compositions are useful as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

5 Claims, 10 Drawing Sheets

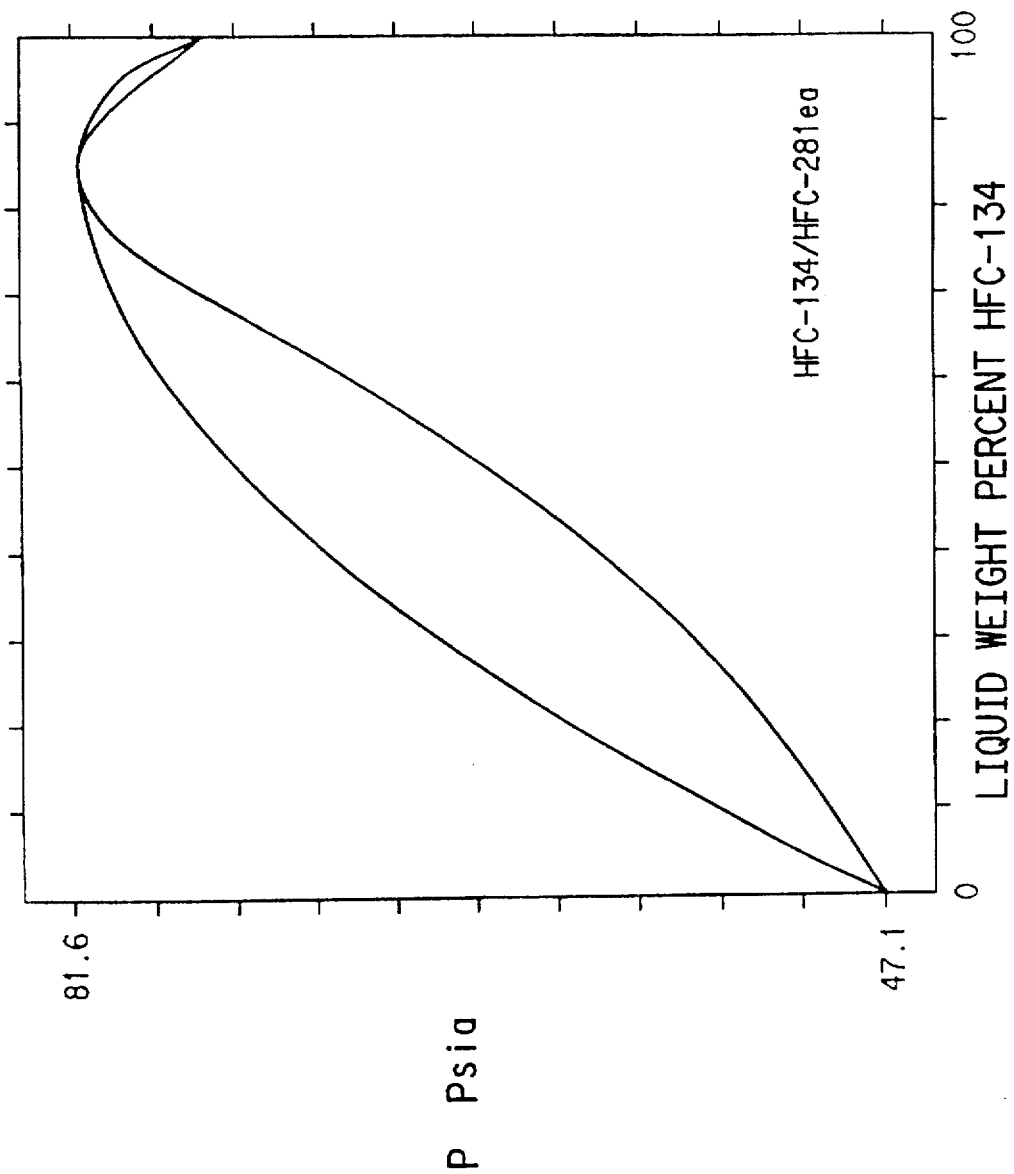

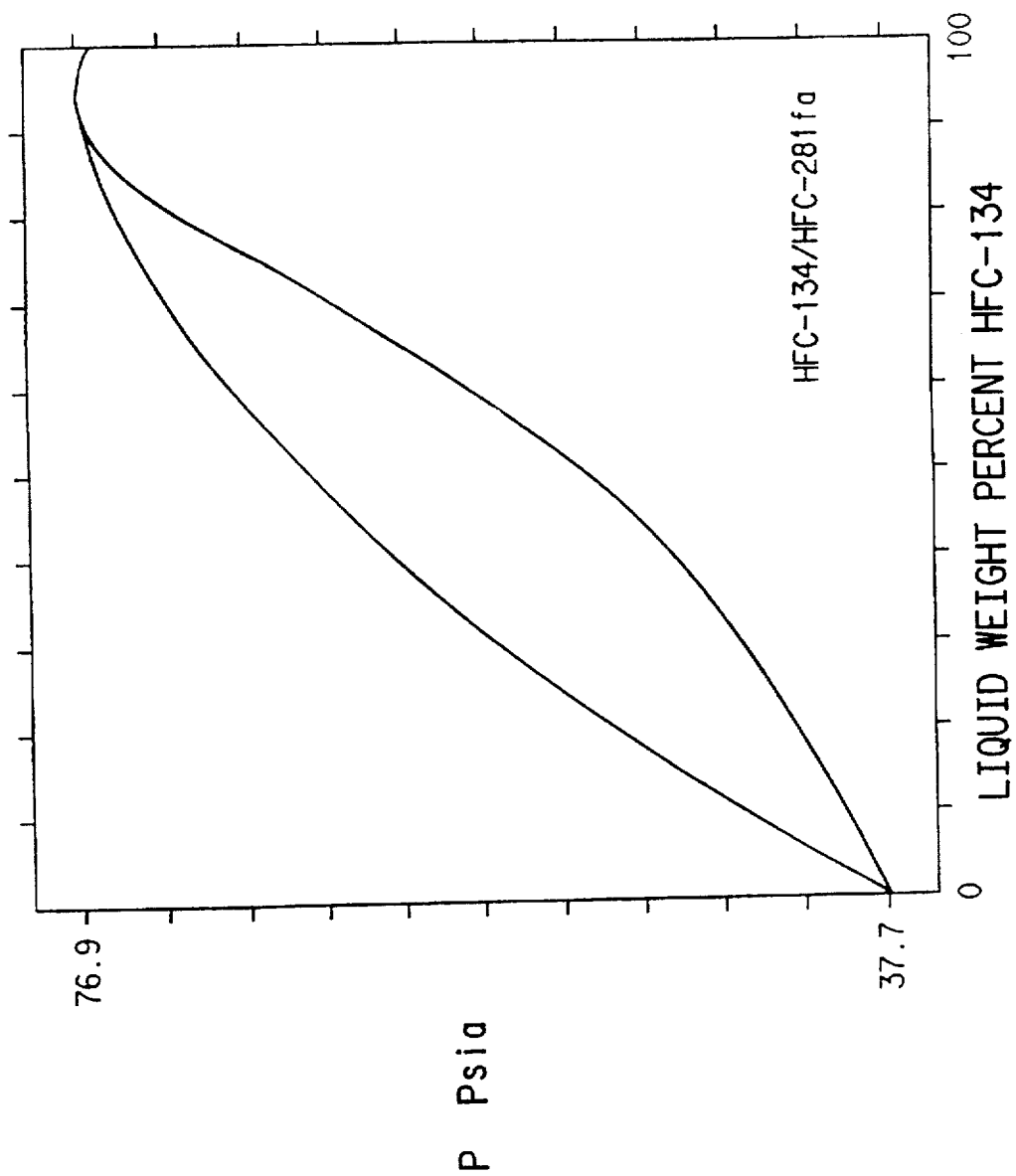

COMPOSITIONS WHICH INCLUDE 1,1,2,2-TETRAFLUOROETHANE AND FLUOROETHANE

CROSS-REFERENCE TO EARLIER FILED APPLICATIONS

This is a division of Ser. No. 08/748,119, filed on Nov. 12, 1996, allowed, which is a continuation-in-part of application Ser. No. 08/192,908, filed Feb. 7, 1994, abandoned, which is a continuation-in-part of application Ser. No. 08/089,004, filed Jul. 9, 1993, abandoned, which is a continuation-in-part of application Ser. No. 07/913,642, filed Jul. 15, 1992, abandoned.

FIELD OF THE INVENTION

This invention relates to compositions that include 1,1,2,2-tetrafluoroethane as a component. These compositions are useful as refrigerants, cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications. Hydrofluorocarbons (HFCs) have been suggested as replacements for CFCs and HCFCs since HFCs have no chlorine and therefore have zero ozone depletion potential.

In refrigeration applications, a refrigerant is often lost during operation through leaks and shaft seals, hose connections, soldered joints and broken lines. In addition, the refrigerant may be released to the atmosphere during maintenance procedures on refrigeration equipment. If the refrigerant is not a pure component or an azeotrope or azeotrope-like composition, the refrigerant composition may change when leaked or discharged to the atmosphere from the refrigeration equipment, causing the refrigerant to become flammable or to have poor refrigeration performance.

Accordingly, it is desirable to use as a refrigerant a pure compound or an azeotropic or azeotrope-like composition that includes two or more compounds.

Fluorinated hydrocarbons may also be used as a cleaning agent or solvent to clean, for example, electronic circuit boards. It is desirable that the cleaning agents be azeotropic or azeotrope-like because in vapor degreasing operations the cleaning agent is generally redistilled and reused for final rinse cleaning.

Azeotropic or azeotrope-like compositions that include a fluorinated hydrocarbon are also useful as blowing agents in the manufacture of closed-cell polyurethane, phenolic and thermoplastic foams, as propellants in aerosols, as heat transfer media, gaseous dielectrics, fire extinguishing agents, power cycle working fluids, such as for heat pumps, inert media for polymerization reactions, fluids for removing particulates from metal surfaces, as carrier fluids that may be used, for example, to place a fine film of lubricant on metal parts, or as buffing abrasive agents to remove buffing abrasive compounds from polysurfaces such as metal, as displacement drying agents for removing water, such as from jewelry or metal parts, as resist developers in conventional circuit manufacturing techniques including chlorine-type developing agents, and as strippers for photoresists when used with, for example, a chlorohydrocarbon, such as 1,1,1-trichloroethane or trichloroethylene.

SUMMARY OF THE INVENTION

The present invention relates to the discovery of compositions of 1,1,2,2-tetrafluoroethane and a propane, tris (trifluoromethyl)amnine, trifluoromethylsulfur pentafluoride or fluoroethane. As used herein, the term propane includes compounds of the formula $C_3F_aH_{8-a}$ wherein $0 \leq a \leq 8$ as well as cyclic compounds of the formula $C_3F_bH_{6-b}$ wherein $0 \leq b \leq 6$. These compositions are useful as refrigerants, cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents. Further, the invention relates to the discovery of binary azeotropic or azeotrope-like compositions comprising effective amounts of 1,1,2,2-tetrafluoroethane and a fluorinated propane, tris (trifluoromethyl)amine, trifluoromethylsulfur pentafluoride or fluoroethane to form an azeotropic or azeotrope-like composition.

BRIEF DESCRIPTION OF THE DRAWINGS

FIG. 9 is a graph of the vapor pressure of liquid mixtures of HFC-134 and HFC-281ea at 25'C; and FIG. 10 is a graph of the vapor pressure of liquid mixtures of HFC-134 and HFC-281fa at 25'C.

DETAILED DESCRIPTION

Figure 1:
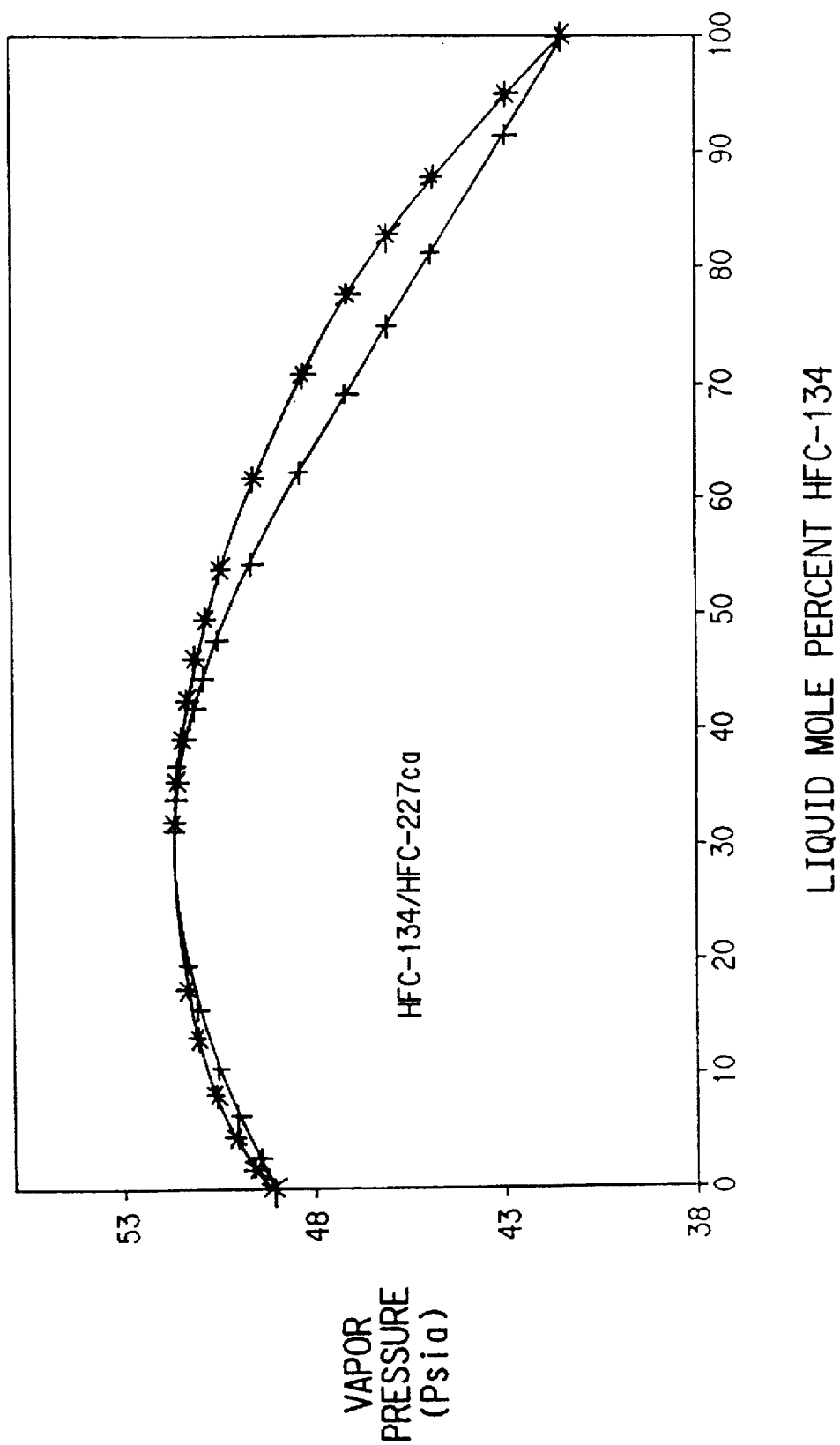
FIG. 1 is a graph of the vapor pressure of liquid mixtures of HFC-134 and HFC-227ca at 11.2'C.

The present invention relates to compositions of 1,1,2,2-tetrafluoroethane (HFC-134), boiling point=−19.7'C and a propane, tris(trifluoromethyl)amine, trifluoromethylsulfur pentafluoride or fluoroethane. As used herein, the term propane includes compounds of the formula $C_3F_aH_{8-a}$ wherein $0 \leq a \leq 8$ as well as cyclic compounds of the formula $C_3F_bH_{6-b}$, wherein $0 \leq b \leq 6$. Compounds of the formula $C_3F_aH_{8-a}$ wherein $0 \leq a \leq 8$ include 1,1,1,2,2,3,3-heptafluoropropane (HFC-227ca, or $CHF_2CF_2CF_3$, boiling point=−17.0'C), 1,1,1,2,2-pentafluoropropane (HFC-245cb or $CF_3CF_2CH_3$, boiling point=−17.5'C), boiling point=−31.5'C), 1,1,1-trifluoropropane (HFC-263fb, or $CH_3CH_2CF_3$, boiling point=−13.0'C), 2,2-difluoropropane (HFC-272ca, or $CH_3CF_2CH_3$, boiling point=−0.4'C), 2-fluoropropane (HFC-281ea, or $CH_3CHFCH_3$, boiling point=−9.4'C) and 1-fluoropropane (HFC-281fa, or $CH_3CH_2CH_2F$, boiling point=−2.5'C). Cyclic compounds of the formula $C_3F_bH_{6-b}$ wherein $0 \leq b \leq 6$ include cyclopropane ($C_3H_6$ (cyclic), boiling point=−32.8'C), perfluorocyclopropane (C216, or $CF_2CF_2CF_2$ (cyclic).

HFC-227ca (CAS Reg. No. 2252-84-8) has been prepared by reaction of 2,2,3,3-tetrafluoropropionic acid with $SF_4$ in the presence of boron trifluoride as reported by Hasek, et. al. in J. Am. Chem. Soc., Vol. 82, pp. 543–551 (1960).

HFC-245cb (CAS Reg. No. 1814-88-6) can be made by reaction of methyl chloride and cesium fluoride with tetrafluoroethylene in triethylene glycol dimethyl ether as disclosed by Yale in U.S. Pat. No. 3,381,042.

C216 (CAS Reg. No. 931-91-9) has been made by photolysis of tetrafluoroethylene in the presence of ethylene diluent as disclosed by Mastrangelo in U.S. Pat. No. 3,228,864.

HFC-263fb (CAS Reg. No. 421-07-8) has been prepared by reaction of 1,1-dichloropropene with HF at 90–100 C. as reported by McBee, et. al. in J. Am. Chem. Soc., Vol. 69, pp. 944–947 (1947).

HFC-272ca (CAS Reg. No. 420-45-1) has been made by fluorination of 2,2-dichloropropane with SbF3 as reported by Henne and Renoll in J. Am. Chem. Soc., Vol. 59, pp. 2434–2436 (1937).

Tris(trifluoromethyl)amine ($(CF_3)_3N$, boiling point=−6.5'C), (CAS Reg. No. 432-03-1) has been made by electrochemical fluorination of trimethyl amine in anhydrous hydrogen fluoride as disclosed by Kauck and Simons in U.S. Pat. No. 2,616,927.

Trifluoromethylsulfur pentafluoride ($SF_5CF_3$, boiling point=−20.4'C), (CAS Reg. No. 373-80-8) has been made by electrochemical fluorination of thiourea as reported by Schmeisser and Huber in Z. Naturforsch., Sect. B, Vol. 21, pp. 285–286 (1966).

Fluoroethane (HFC-161, or $CH_3CFH_2$, boiling point=−37.7'C), (CAS Reg. No. 353-36-6), HFC-281ea (isopropyl fluoride, CAS Reg. No. 420-26-8), and HFC-281fa (n-propyl fluoride, CAS Reg. No. 460-13-9) have been prepared by reaction of hydrogen fluoride with ethylene, propylene, and cyclopropane, respectively, as reported by Grosse and Lin in J. Org. Chem., Vol. 3, pp. 26–32 (1938).

The following compositions can be used as refrigerants.

TABLE 1

| Composition No. | | |
|---|---|---|
| 1 | 1–99 wt % HFC-134 | 1–99 wt % HFC-227ca |
| 2 | 1–99 wt % HFC-134 | 1–99 wt % HFC-245cb |
| 3 | 1–99 wt % HFC-134 | 1–99 wt % $(CF_3)_3N$ |
| 4 | 1–99 wt % HFC-134 | 1–99 wt % $SF_5CF_3$ |
| 5 | 1–99 wt % HFC-134 | 1–99 wt % cyclopropane |
| 6 | 1–99 wt % HFC-134 | 1–99 wt % C216 |
| 7 | 1–99 wt % HFC-134 | 1–99 wt % HFC-161 |

TABLE 1-continued

| Composition No. | | |
|---|---|---|
| 8 | 1–99 wt % HFC-134 | 1–99 wt % HFC-263fb |
| 9 | 1–99 wt % HFC-134 | 1–99 wt % HFC-272ca |
| 10 | 1–99 wt % HFC-134 | 1–99 wt % HFC-281ea |
| 11 | 1–99 wt % HFC-134 | 1–99 wt % HFC-281fa |

The present invention also relates to the discovery of azeotropic or azeotrope-like compositions of effective amounts of HFC-134 and a second component to form an azeotropic or azeotrope-like composition, wherein the second component is HFC-227ca, HFC-245cb, $(CF_3)_3N$, $SF_5CF_3$, cyclopropane, C216, HFC-161, HFC-263fb, HFC-272ca, HFC-281ea or HFC-281fa.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of HFC-134 and a second component, wherein the second component is HFC-227ca, HFC-245cb, $(CF_3)_3N$, $SF_5CF_3$, cyclopropane, C216, HFC-161, HFC-263fb, HFC-272ca, HFC-281ea or HFC-281fa such that after 50 weight percent of an original composition is evaporated or boiled off to produce a remaining composition, the difference in the vapor pressure between the original composition and the remaining composition is 10 percent or less.

Substantially constant boiling, azeotropic or azeotrope-like compositions of this invention comprise the following (all compositions are measured at 25'C):

1. 1–99, preferably 40–90, most preferably 61.1 wt % HFC-134; 1–99, preferably 10–60, most preferably 38.9 wt % HFC-227ca.

2. 1–99, preferably 30–90, most preferably 60.4 wt % HFC-134; 1–99, preferably 10–70, most preferably 39.6 wt % HFC-245cb.

3. 27–84, preferably 40–70, most preferably 56.4 wt % HFC-134; 16–73, preferably 30–60, most preferably 43.6 wt % $(CF_3)_3N$.

4. 1–71, preferably 20–71, most preferably, 37.8 wt % HFC-134; 29–99, preferably 29–80, most preferably 62.2 wt % $SF_5CF_3$.

5. 1–84, preferably 40–84, most preferably 50.5 wt % HFC-134; 16–99, preferably 16–60, most preferably 49.5 wt % cyclopropane.

6. 1–99, preferably 10–50, most preferably 29.2 wt % HFC-134; 1–99, preferably 50–90, most preferably 70.8 wt % FC-C216.

7. 1–99, preferably 50–99 wt % HFC-134; 1–99, preferably 1–50 wt % HFC-161.

8. 31–99, preferably 50–99, most preferably 67.2 wt % HFC-134; 1–69, preferably 1–50, most preferably 32.8 wt % HFC-263fb.

9. 51–99, preferably 70–99, most preferably 84.0 wt % HFC-134; 1–49, preferably 1–30, most preferably 16.0 wt % HFC-272ca.

10. 48–99, preferably 70–99, most preferably 84.7 wt % HFC-134; 1–52, preferably 1–30, most preferably 15.3 wt % HFC-281ea.

11. 58–99, preferably 80–99, most preferably 93.8 wt % HFC-134; 1–42, preferably 1–20, most preferably 6.2 wt % HFC-281fa.

The components of the compositions of this invention have the following vapor pressures at 25'C.

| COMPONENTS | PSIA | KPA |
| --- | --- | --- |
| HFC-134 | 76.1 | 525 |
| HFC-227ca | 63.8 | 440 |
| HFC-245cb | 67.4 | 465 |
| $(CF_3)_3N$ | 45.8 | 316 |
| $SF_5CF_3$ | 74.7 | 515 |
| Cyclopropane | 105.0 | 724 |
| C216 | 95.1 | 655 |
| HFC-161 | 130.2 | 898 |
| HFC-263fb | 54.0 | 372 |
| HFC-272ca | 34.5 | 238 |
| HFC-281ea | 47.1 | 325 |
| HFC-281fa | 37.7 | 260 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective amount includes the amounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

* The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

* It is well known by those skilled in the art, that, at different pressures, the composition of a given azeotrope will vary at least to some degree, and changes in pressure will also change, at least to some degree, the boiling point temperature. Thus, and azeotrope of A, B, C (and D . . . ) represents a unique type of relationship but with a variable composition which depends on temperature and/or pressure. Therefore, compositional ranges, rather than fixed compositions, are often used to define azeotropes.

* The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

* An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

For compositions that are azeotropic, there is usually some range of compositions around the azeotrope that, for a maximum boiling azeotrope, have boiling points at a particular pressure higher than the pure components of the composition at that pressure and have vapor pressures lower at a particular temperature than the pure components of the composition at that temperature, and that, for a minimum boiling azeotrope, have boiling points at a particular pressure lower than the pure components of the composition at that pressure and have vapor pressures higher at a particular temperature than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that are substantially constant boiling. In those cases where the range of compositions that have maximum or minimum boiling temperatures at a particular pressure, or maximum or minimum vapor pressures at a particular temperature, are broader than the range of compositions that are substantially constant boiling according to the change in vapor pressure of the composition when 50 weight percent is evaporated, the unexpected intermolecular forces are nonetheless believed important in that the refrigerant compositions having those forces that are not substantially constant boiling may exhibit unexpected increases in the capacity or efficiency versus the components of the refrigerant composition.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study on the following compositions, wherein the composition is varied and the vapor pressures is measured, at a constant temperature of 25'C, shows that the following compositions are azeotropic.

| Composition No. | | Vapor Press. | | psia (kpa) |
|---|---|---|---|---|
| 1 | 61.1 wt % HFC-34 | 38.9 wt % HFC-227ca | | 80.4 (554) |
| 2 | 60.4 wt % HFC-34 | 39.6 wt % HFC-245cb | | 81.2 (560) |
| 3 | 56.4 wt % HFC-134 | 43.6 wt % $(CF_3)_3N$ | | 92.3 (636) |
| 4 | 37.8 wt % HFC-134 | 62.2 wt % $SF_5CF_3$ | | 106.2 (732) |
| 5 | 50.5 wt % HFC-134 | 49.5 wt % cyclopropane | | 123.0 (848) |
| 6 | 29.2 wt % HFC-134 | 70.8 wt % C216 | | 103.9 (716) |
| 8 | 67.2 wt % HFC-134 | 32.8 wt % HFC-263fb | | 87.3 (602) |
| 9 | 84.0 wt % HFC-134 | 16.0 wt % HFC-272ca | | 80.3 (554) |
| 10 | 84.7 wt % HFC-134 | 15.3 wt % HFC-281ea | | 81.6 (563) |
| 11 | 93.8 wt % HFC-134 | 6.2 wt % HFC-281fa | | 76.9 (530) |

EXAMPLE 2

Impact of Vapor Leakage on Vapor Pressure at 25'C

A vessel is charged with an initial composition at 25'C, and the vapor pressure of the composition is measured. The composition is allowed to leak from the vessel, while the temperature is held constant at 25'C, until 50 weight percent of the initial composition has been removed, at which time the vapor pressure of the composition remaining in the vessel is measured. The results are summarized below.

| Refrigerant Composition | 0 wt % evaporated psia (kPa) | 50 wt % evaporated psia (kPa) | 0% change in vapor pressure |
|---|---|---|---|
| HFC-134/HFC-227ca | | | |
| 99.0/1.0 | 76.3 (526) | 76.3 (526) | 0.0 |
| 80.0/20.0 | 79.4 (547) | 79.2 (546) | 0.3 |
| 61.1/38.9 | 80.4 (554) | 80.4 (554) | 0.0 |
| 40.0/60.0 | 79.1 (545) | 78.6 (542) | 0.6 |
| 20.0/80.0 | 74.6 (514) | 72.9 (503) | 2.3 |
| 10.0/90.0 | 70.3 (485) | 68.5 (472) | 2.6 |
| 1.0/99.0 | 64.6 (445) | 64.3 (443) | 0.5 |
| HFC-134/HFC-245cb | | | |
| 99.0/1.0 | 76.4 (527) | 76.3 (526) | 0.1 |
| 90.0/10.0 | 78.6 (542) | 78.1 (538) | 0.6 |
| 80.0/20.0 | 80.1 (552) | 79.8 (550) | 0.4 |
| 60.4/39.6 | 81.2 (560) | 81.2 (560) | 0.0 |
| 40.0/60.0 | 80.0 (552) | 79.6 (549) | 0.5 |
| 20.0/80.0 | 76.0 (524) | 74.6 (514) | 1.8 |
| 10.0/90.0 | 72.4 (499) | 71.1 (490) | 1.8 |
| 1.0/99.0 | 68.0 (469) | 67.8 (467) | 0.3 |
| HFC-134/$(CF_3)_3N$ | | | |
| 84.0/16.0 | 89.5 (617) | 80.7 (557) | 9.8 |
| 70.0/30.0 | 91.8 (633) | 90.5 (624) | 1.4 |
| 56.4/43.6 | 92.3 (636) | 92.3 (636) | 0 |
| 40.0/60.0 | 91.3 (629) | 89.5 (617) | 2.0 |
| 27.0/73.0 | 88.1 (607) | 79.6 (549) | 9.6 |
| HFC-134/$SF_5CF_3$ | | | |
| 72.0/28.0 | 100.9 (696) | 90.5 (624) | 10.3 |
| 71.0/29.0 | 101.2 (698) | 91.5 (631) | 9.6 |
| 60.0/40.0 | 104.0 (717) | 100.5 (693) | 3.4 |
| 37.8/62.2 | 106.2 (732) | 106.2 (732) | 0.0 |
| 20.0/80.0 | 103.4 (713) | 100.7 (694) | 2.6 |
| 10.0/90.0 | 96.9 (668) | 91.4 (630) | 5.7 |
| 1.0/99.0 | 83.4 (575) | 82.0 (565) | 1.7 |
| HFC-134/cyclopropane | | | |
| 50.5/49.5 | 123.0 (848) | 123.0 (848) | 0.0 |
| 70.0/30.0 | 120.4 (830) | 117.3 (809) | 2.6 |
| 80.0/20.0 | 115.4 (796) | 106.9 (737) | 7.4 |
| 85.0/15.0 | 110.8 (764) | 99.1 (683) | 10.6 |
| 84.0/16.0 | 111.8 (771) | 100.8 (695) | 9.8 |
| 30.0/70.0 | 121.0 (834) | 118.4 (816) | 2.1 |
| 10.0/90.0 | 113.5 (783) | 107.9 (744) | 4.9 |
| 1.0/99.0 | 106.1 (732) | 105.2 (725) | 0.8 |
| HFC-134/C216 | | | |
| 99.0/1.0 | 77.1 (532) | 76.4 (527) | 0.9 |
| 50.0/50.0 | 101.7 (701) | 100.3 (692) | 1.4 |
| 29.2/70.8 | 103.9 (716) | 103.9 (716) | 0 |
| 10.0/90.0 | 100.8 (695) | 100.0 (689) | 0.8 |
| 1.0/99.0 | 95.8 (661) | 95.6 (659) | 0.2 |
| HFC-134/HFC-161 | | | |
| 1.0/99.0 | 130.3. (898) | 130.3 (898) | 0.0 |
| 10.0/90.0 | 130.0 (896) | 129.9 (896) | 0.1 |
| 20.0/80.0 | 128.6 (887) | 127.7 (880) | 0.7 |
| 30.0/70.0 | 126.2 (870) | 124.0 (855) | 1.7 |
| 40.0/60.0 | 122.8 (847) | 119.0 (820) | 3.1 |
| 50.0/50.0 | 118.3 (816) | 112.9 (778) | 4.6 |
| 60.0/40.0 | 112.6 (776) | 106.0 (731) | 5.9 |
| 70.0/30.0 | 105.5 (727) | 98.6 (680) | 6.5 |
| 80.0/20.0 | 97.0 (669) | 90.9 (627) | 6.3 |
| 90.0/10.0 | 87.2 (601) | 83.4 (575) | 4.4 |
| 99.0/1.0 | 77.3 (533) | 76.8 (530) | 0.6 |
| HFC-134/HFC-263fb | | | |
| 31.0/69.0 | 81.2 (560) | 73.4 (506) | 9.6 |
| 50.0/50.0 | 86.0 (593) | 84.5 (583) | 1.7 |
| 67.2/32.8 | 87.3 (602) | 87.3 (602) | 0 |
| 90.0/10.0 | 83.3 (574) | 81.0 (558) | 2.8 |
| 99.0/90.0 | 77.1 (532) | 76.5 (527) | 0.8 |
| HFC-134/HFC-272ca | | | |
| 51.0/49.0 | 75.6 (521) | 68.4 (472) | 9.5 |
| 70.0/30.0 | 79.2 (546) | 78.0 (538) | 1.5 |
| 84.0/16.0 | 80.3 (554) | 80.3 (554) | 0 |
| 99.0/1.0 | 76.8 (530) | 76.5 (527) | 0.4 |

| Refrigerant Composition | 0 wt % evaporated psia (kPa) | 50 wt % evaporated psia (kPa) | 0% change in vapor pressure |
|---|---|---|---|
| HFC-134/HFC-281ea | | | |
| 48.0/52.0 | 74.0 (510) | 66.7 (460) | 9.9 |
| 70.0/30.0 | 80.0 (552) | 78.6 (542) | 1.7 |
| 84.7/15.3 | 81.6 (563) | 81.6 (563) | 0 |
| 99.0/1.0 | 77.1 (532) | 76.7 (529) | 0.5 |
| HFC-134/HFC-281fa | | | |
| 58.0/42.0 | 68.9 (475) | 62.2 (429) | 9.7 |
| 80.0/20.0 | 75.1 (518) | 74.0 (510) | 1.5 |
| 93.8/6.2 | 76.9 (530) | 76.9 (530) | 0 |
| 99.0/1.0 | 76.4 (527) | 76.3 (526) | 0.1 |

The results of this Example show that these compositions are azeotropic or azeotrope-like because when 50 wt % of an original composition is removed, the vapor pressure of the remaining composition is within about 10% of the vapor pressure of the original composition, at a temperature of 25'C.

EXAMPLE 3

Leak Test at 43.9'C.

A leak test is performed as in Example 2, except that the composition is allowed to leak at 43.9'C. The data below show that when 50 wt % of an original composition is removed, the vapor pressure of the remaining composition is within about 10% of the vapor pressure of the original composition, at a temperature of 43.9'C.

| HFC-134/cyclopropane | | | |
|---|---|---|---|
| 53.5/46.5 | 199.7 (1377) | 199.7 (1377) | 0.0 |
| 70.0/30.0 | 196.6 (1356) | 193.2 (1332) | 1.7 |
| 89.0/11.0 | 174.8 (1205) | 157.4 (1085) | 10.0 |
| 90.0/10.0 | 172.4 (1189) | 154.7 (1067) | 10.3 |
| 20.0/80.0 | 190.3 (1312) | 181.0 (1248) | 4.9 |
| 10.0/90.0 | 182.0 (1255) | 173.1 (1193) | 4.9 |
| 1.0/99.0 | 170.2 (1173) | 168.8 (1164) | 0.8 |

EXAMPLE 4

Refrigerant Performance

The following table shows the performance of the inventive refrigerants. The data are based on the following conditions.

| | |
|---|---|
| Evaporator temperature | 45.0' F. (7.2' C.) |
| Condenser temperature | 130.0' F. (54.4' C.) |
| Subcool temperature | 15.0' F. (8.3' C.) |
| Return gas temperature | 65.0' F. (18.3' C.) |

Compressor efficiency is 75%.

The refrigeration capacity is based on a compressor with a fixed displacement of 3.5 cubic feet per minute and 75% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Refrig. Comp. | Evap. Press. Psia (kPa) | Cond. Press. Psia (kPa) | Comp. Dis. Temp. 'F. ('C.) | COP | Capacity BTU/min (kw) |
|---|---|---|---|---|---|
| HCFC-22 | 90.6 (625) | 312.6 (2155) | 212.8 (100.4) | 3.41 | 351.3 (6.2) |
| HFC-134/HFC-227ca | | | | | |
| 1.0/99.0 | 36.8 (254) | 144.2 (994) | 143.0 (61.7) | 3.21 | 136.2 (2.4) |
| 99.0/1.0 | 42.2 (291) | 169.9 (1171) | 182.0 (83.3) | 3.59 | 188.7 (3.3) |
| HFC-134/HFC-245cb | | | | | |
| 1.0/99.0 | 36.5 (252) | 138.5 (955) | 139.3 (59.6) | 3.31 | 137.6 (2.4) |
| 99.0/1.0 | 42.3 (292) | 170.2 (1173) | 182.0 (83.3) | 3.58 | 188.9 (3.3) |
| HFC-134/(CF$_3$)$_3$N | | | | | |
| 5.0/95.0 | 29.3 (202) | 125.9 (868) | 135.5 (57.5) | 3.17 | 113.0 (2.0) |
| 95.0/5.0 | 43.6 (301) | 174.0 (1200) | 179.6 (82.0) | 3.59 | 193.0 (3.4) |
| HFC-134/SF$_5$CF$_3$ | | | | | |
| 1.0/99.0 | 46.5 (321) | 195.9 (1351) | 155.5 (68.6) | 3.17 | 179.0 (3.2) |
| 99.0/1.0 | 42.6 (294) | 171.1 (1780) | 182.1 (83.4) | 3..60 | 190.5 (3.4) |
| HFC-134/cyclopropane | | | | | |
| 1.0/99.0 | 62.9 (434) | 217.4 (1499) | 201.1 (93.9) | 3.64 | 261.2 (4.6) |
| 99.0/1.0 | 44.5 (307) | 178.6 (1231) | 174.3 (79.1) | 3.61 | 199.2 (3.5) |
| HFC-134/C216 | | | | | |
| 1.0/99.0 | 58.1 (401) | 195.6 (1349) | 142.0 (61.1) | 3.14 | 186.7 (3.3) |
| 99.0/1.0 | 43.0 (296) | 174.5 (1203) | 473.9 (78.8) | 3.58 | 192.2 (3.4) |
| HFC-134/HFC-161 | | | | | |
| 1/99 | 78.3 (540) | 276.4 (1905) | 202.6 (94.8) | 3.49 | 314.4 (5.5) |
| 99/1 | 42.9 (296) | 174.7 (1205) | 175.0 (79.4) | 3.57 | 192.1 (3.4) |
| HFC-134/HFC-263fb | | | | | |
| 5.0/95.0 | 31.5 (217) | 123.3 (850) | 155.8 (68.8) | 3.54 | 133.4 (2.3) |

-continued

| Refrig. Comp. | Evap. Press. Psia (kPa) | Cond. Press. Psia (kPa) | Comp. Dis. Temp. °F. (°C.) | COP | Capacity BTU/min (kw) |
|---|---|---|---|---|---|
| 99.0/1.0 HFC-134/HFC-272ca | 42.1 (290) | 169.4 (1168) | 182.0 (83.3) | 3.59 | 188.5 (3.3) |
| 5.0/95.0 | 19.8 (137) | 81.5 (562) | 161.4 (71.9) | 3.71 | 93.0 (1.6) |
| 99.0/1.0 HFC-134/HFC-281ea | 41.8 (288) | 168.2 (1160) | 182.1 (83.4) | 3.60 | 187.3 (3.3) |
| 5.0/95.0 | 26.9 (185) | 106.6 (735) | 168.6 (75.9) | 3.69 | 122.6 (2.2) |
| 99.0/1.0 HFC-134/HFC-281fa | 41.8 (288) | 168.3 (1160) | 182.2 (83.4) | 3.59 | 187.3 (3.3) |
| 5.0/95.0 | 21.2 (146) | 88.6 (611) | 169.9 (76.6) | 3.73 | 101.7 (1.8) |
| 99.0/1.0 | 41.5 (286) | 167.6 (1156) | 182.3 (83.5) | 3.60 | 186.6 (3.3) |

EXAMPLE 5

This Example is directed to measurements of the liquid/vapor equilibrium curves for the mixtures in FIGS. 3 and 6–10.

Figure 3:
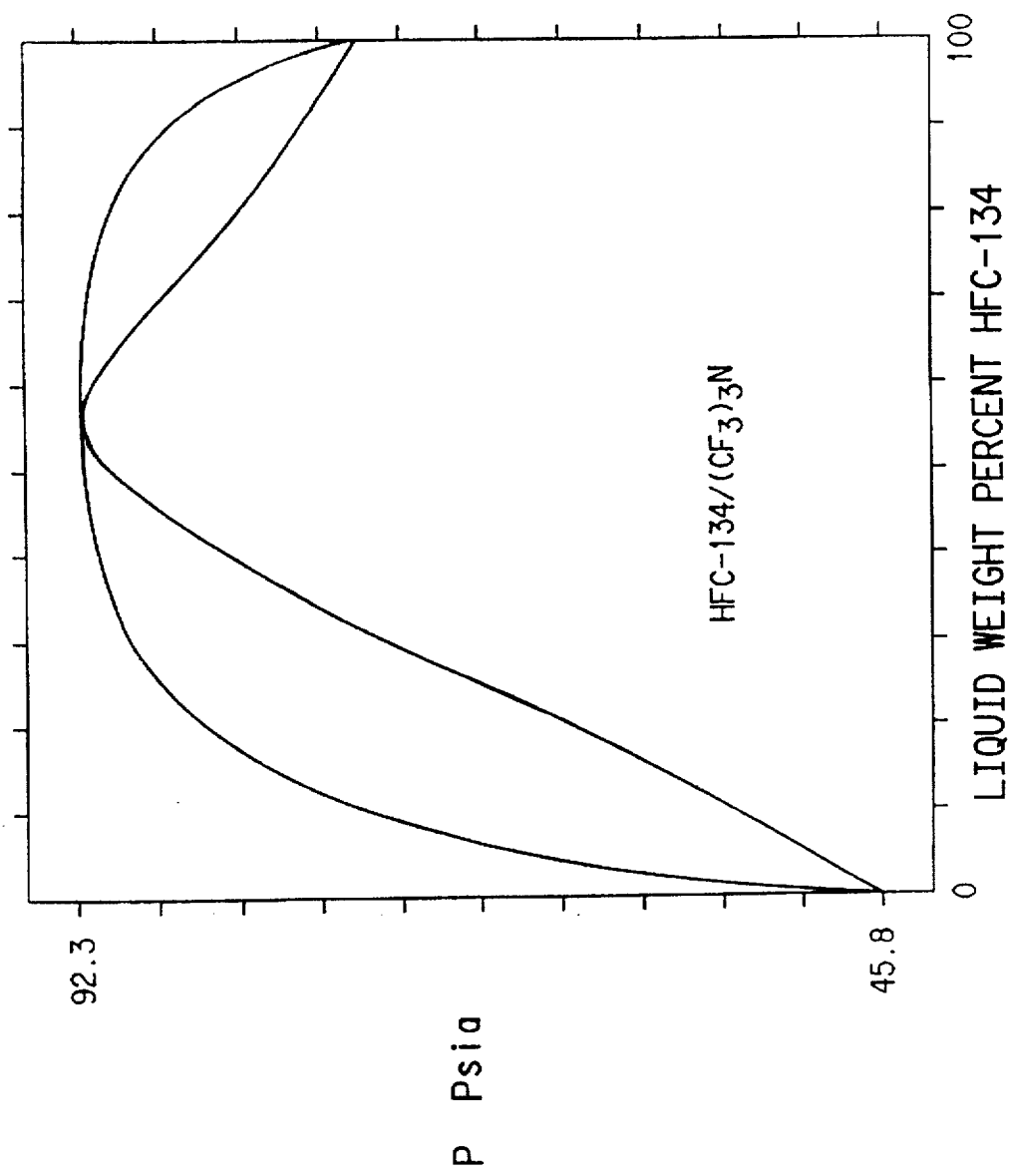
FIG. 3 is a graph of the vapor pressure of liquid mixtures of HFC-134 and $(CF_3)_3N$ at 25'C.

Turning to FIG. 3, the upper curve represents the composition of the liquid, and the lower curve represents the composition of the vapor.

The data for the compositions of the liquid in FIG. 3 are obtained as follows. A stainless steel cylinder is evacuated, and a weighed amount of HFC-134 is added to the cylinder. The cylinder is cooled to reduce the vapor pressure of HFC-134, and then a weighed amount of $(CF_3)_3N$ is added to the cylinder. The cylinder is agitated to mix the HFC-134 and $(CF_3)_3N$, and then the cylinder is placed in a constant temperature bath until the temperature comes to equilibrium at 25°C, at which time the vapor pressure of the HFC-134 and $(CF_3)_3N$ in the cylinder is measured. Additional samples of liquid are measured the same way, and the results are plotted in FIG. 3.

The curve which shows the composition of the vapor is calculated using an ideal gas equation of state.

Vapor/liquid equilibrium data are obtained in the same way for the mixtures shown in FIGS. 6–10.

The data in FIGS. 3 and 6–10 show that at 25°C, there are ranges of compositions that have vapor pressures higher than the vapor pressures of the pure components of the composition at that same temperature. As stated earlier, the higher than expected pressures of these compositions may result in an unexpected increase in the refrigeration capacity and efficiency for these compositions verus the pure components of the compositions.

EXAMPLE 6

This Example is directed to measurements of the liquid/vapor equilibrium curve for mixtures in FIGS. 1–2 and 4–5. The upper curve represents the liquid composition, and the lower curve represents the vapor composition.

The procedure for measuring the composition of the liquid for mixtures of HFC-134 and HFC-227ca in FIG. 1 was as follows. A stainless steel cylinder was evacuated, and a weighed amount of HFC-134 was added to the cylinder. The cylinder was cooled to reduce the vapor pressure of HFC-134, and then a weighed amount of HFC-227ca was added to the cylinder. The cylinder was agitated to mix the HFC-134 and HFC-227ca, and then the cylinder was placed in a constant temperature bath until the temperature came to equilibrium at 11.2°C, at which time the vapor pressure of the content of the cylinder was measured. Samples of the liquid in the cylinder were taken and analyzed, and the results are plotted in FIG. 1 as asterisks, with a best fit curve having been drawn through the asterisks.

This procedure was repeated for various mixtures of HFC-134 and HFC-227ca as indicated in FIG. 1.

The curve which shows the composition of the vapor is calculated using an ideal gas equation of state.

The data in FIG. 1 show that at 11.2°C, there are ranges of compositions that have vapor pressures higher than the vapor pressures of the pure components of the composition at that same temperature. As stated previously, the higher than expected pressures of these compositions may result in an unexpected increase in the refrigeration capacity and efficiency for these compositions versus the pure components of the compositions.

Figure 2:
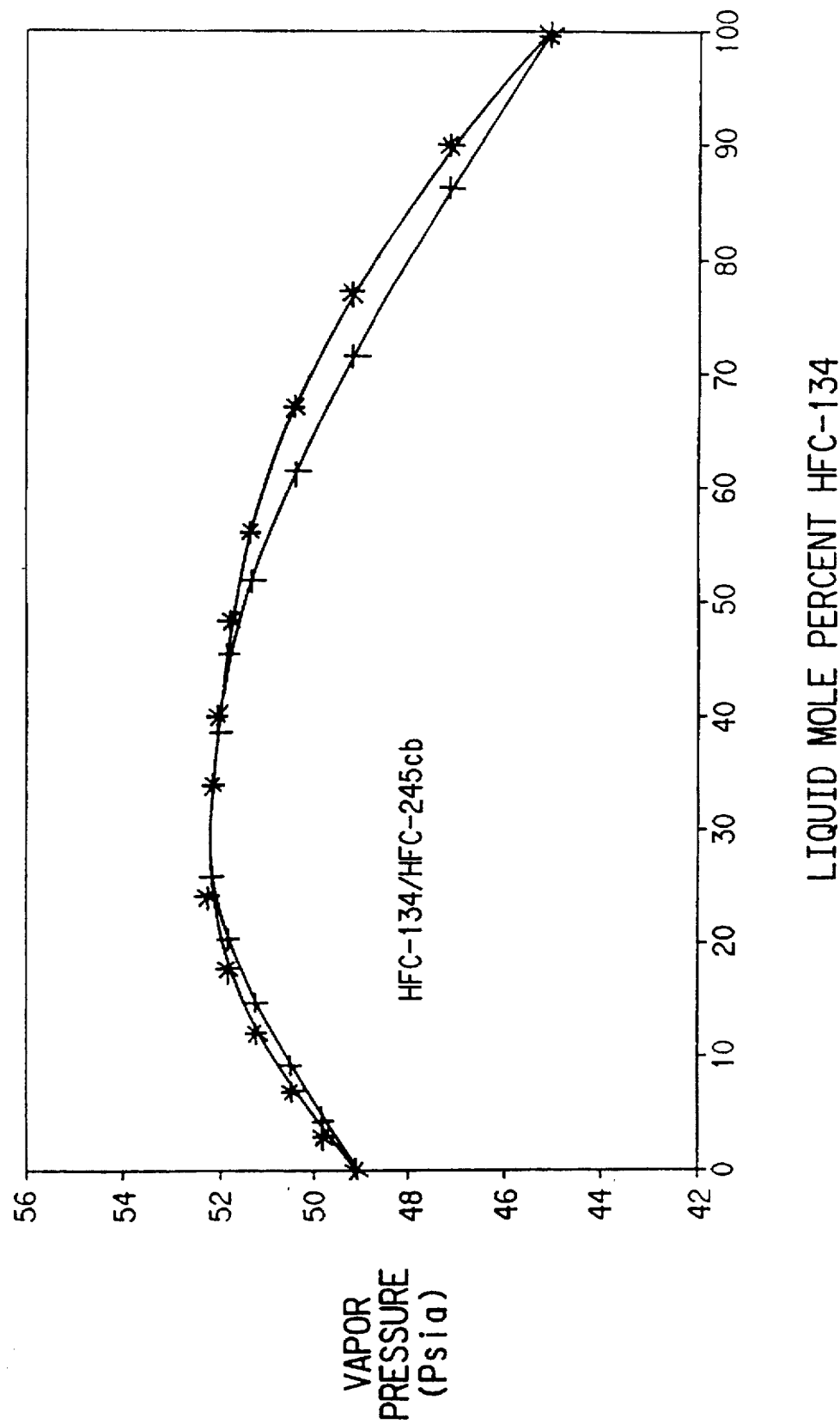
FIG. 2 is a graph of the vapor pressure of liquid mixtures of HFC-134 and HFC-245cb at 11.2'C.
Figure 4:
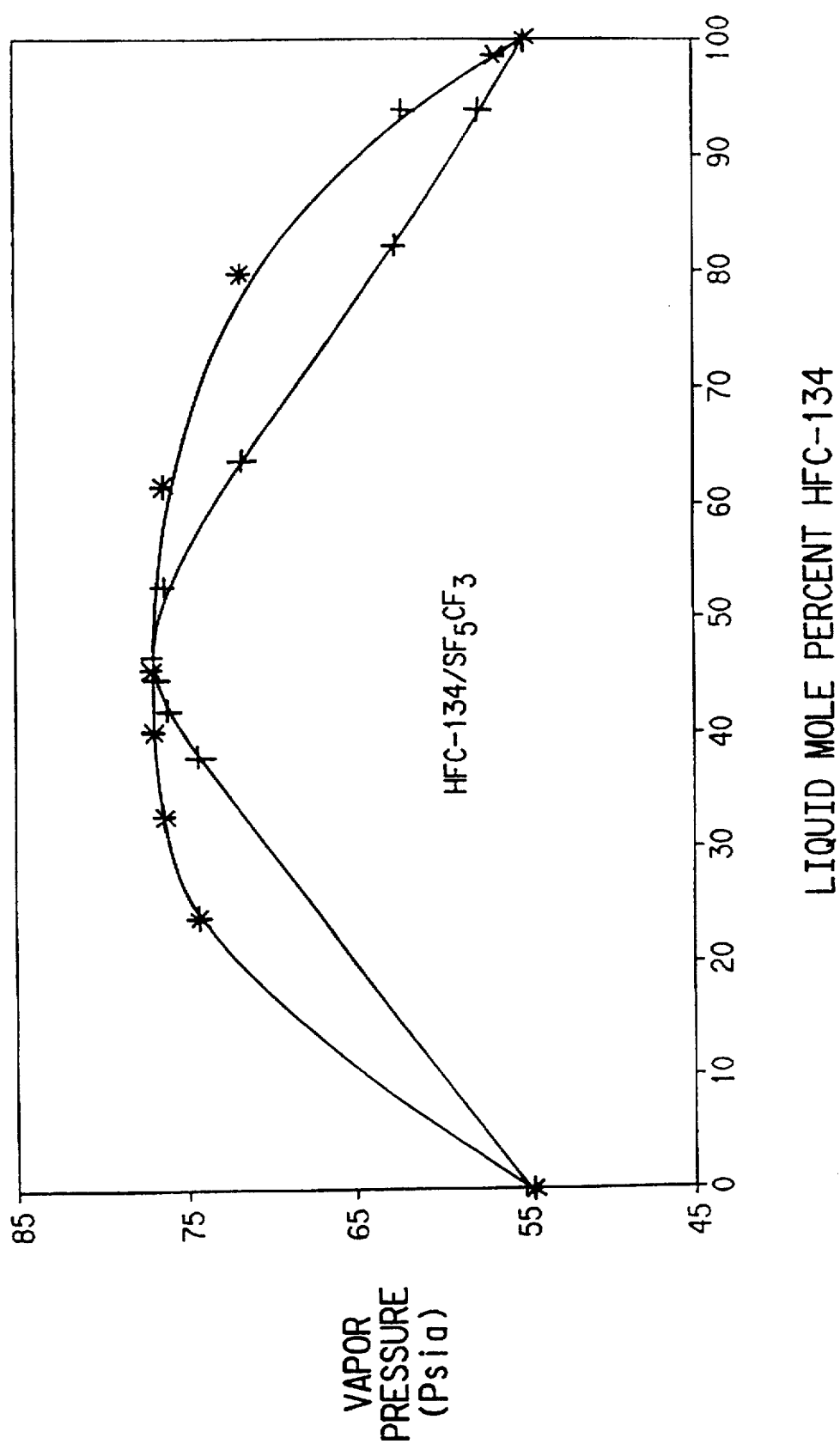
FIG. 4 is a graph of the vapor pressure of liquid mixtures of HFC-134 and $SF_5CF_3$ at 14.4'C.
Figure 5:
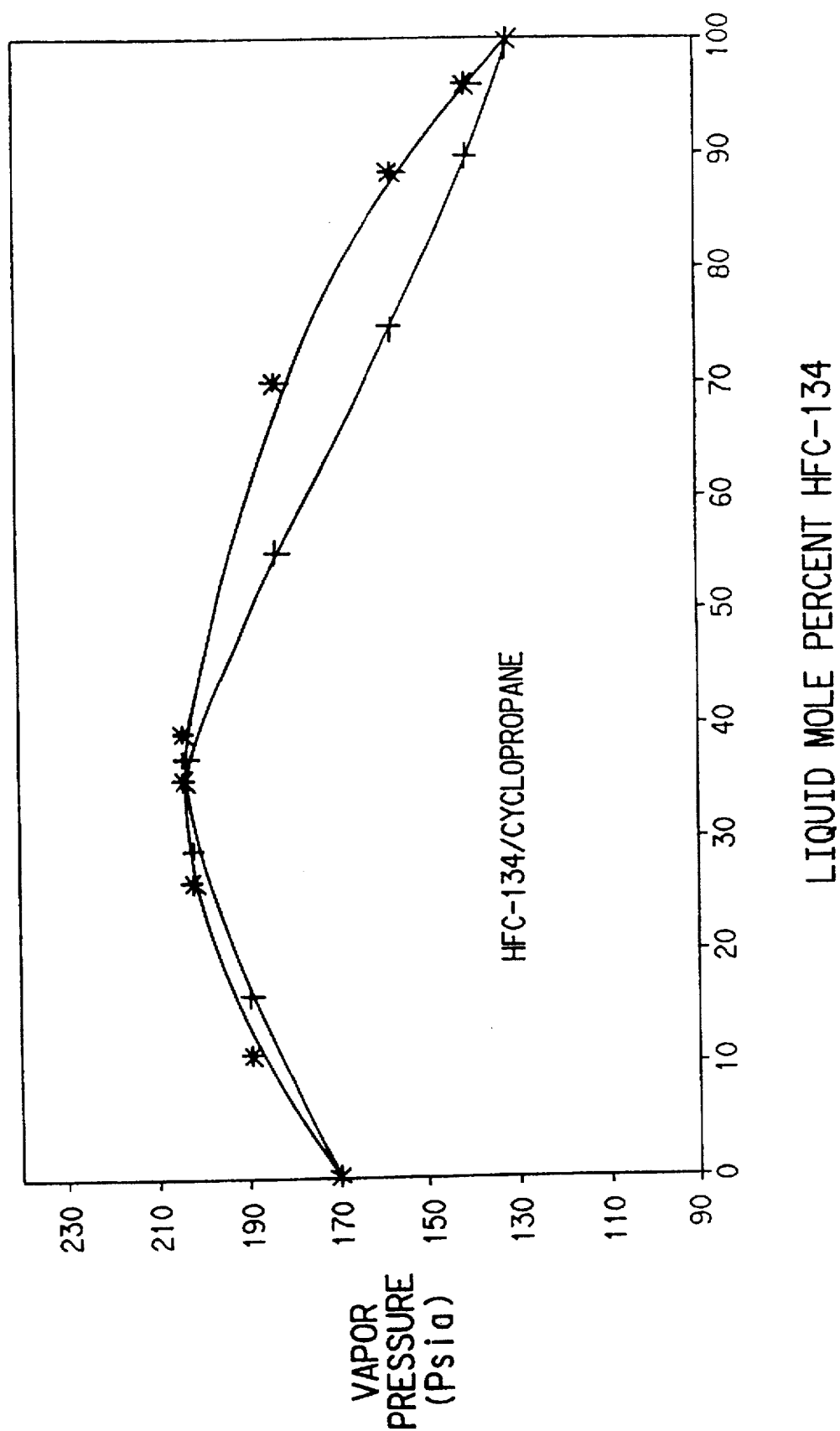
FIG. 5 is a graph of the vapor pressure of liquid mixtures of HFC-134 and cyclopropane at 43.9'C.
Figure 6:
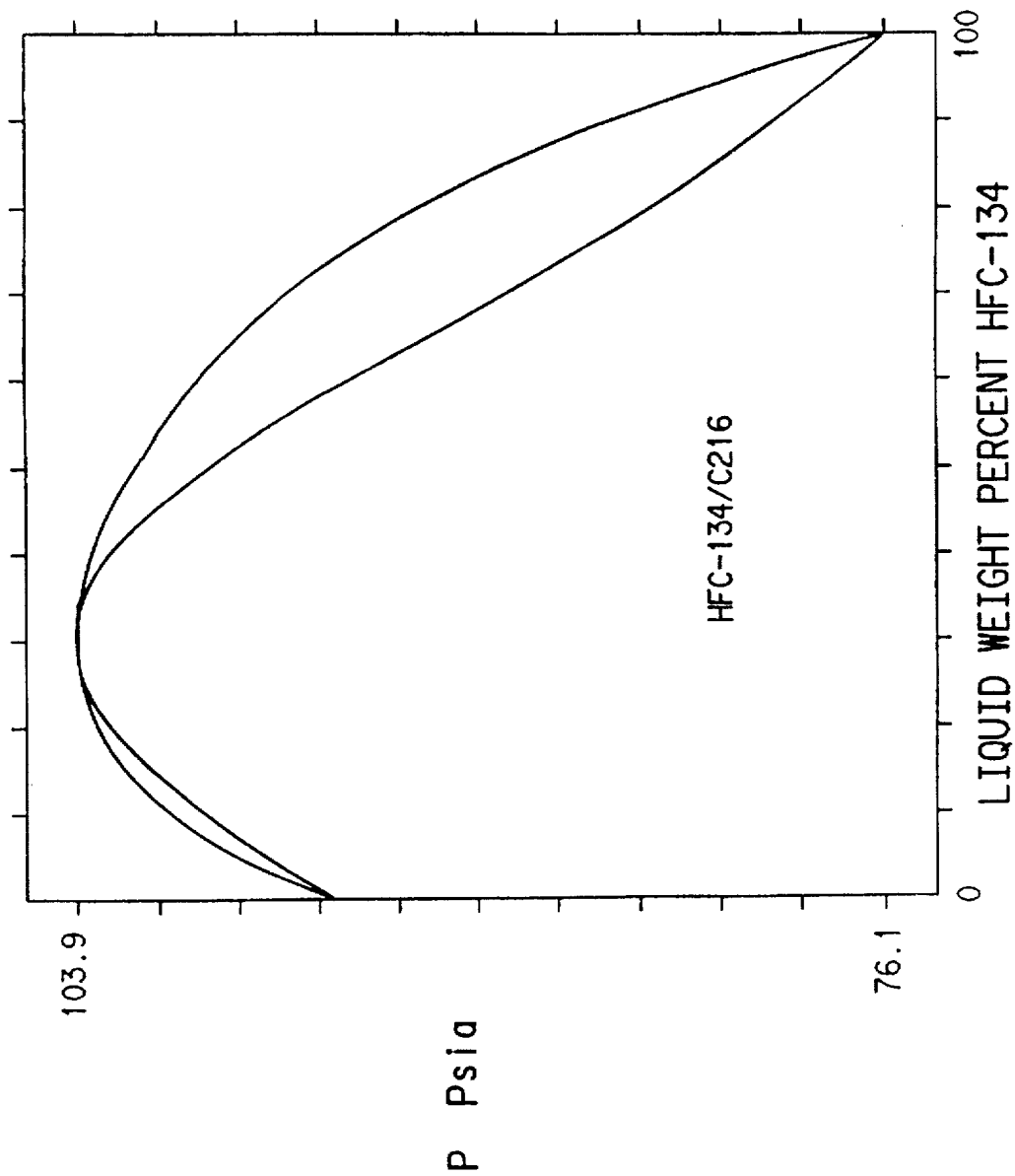
FIG. 6 is a graph of the vapor pressure of liquid mixtures of HFC-134 and C216 at 25'C.
Figure 7:
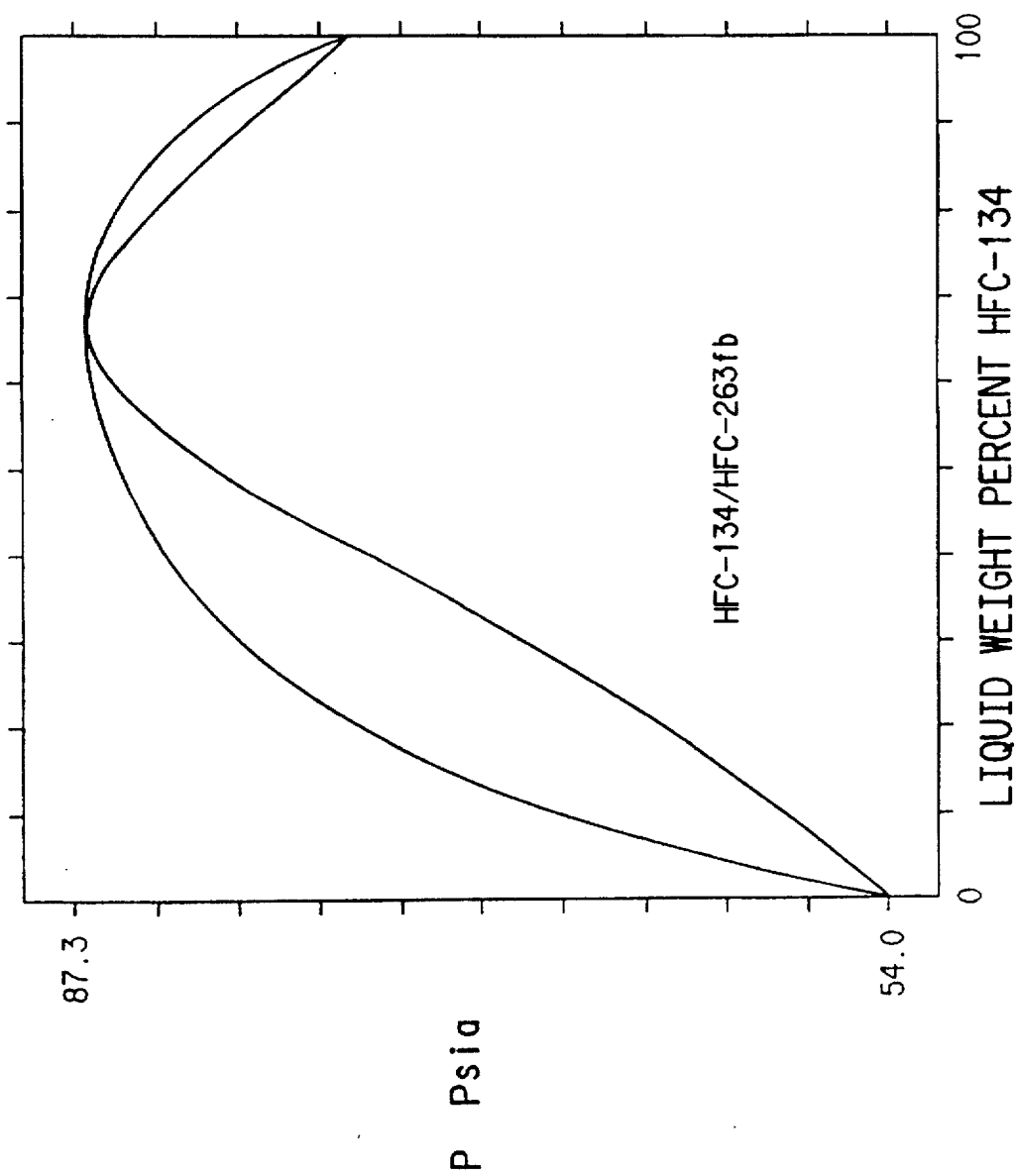
FIG. 7 is a graph of the vapor pressure of liquid mixtures of HFC-134 and HFC-263fb at 25'C.
Figure 8:
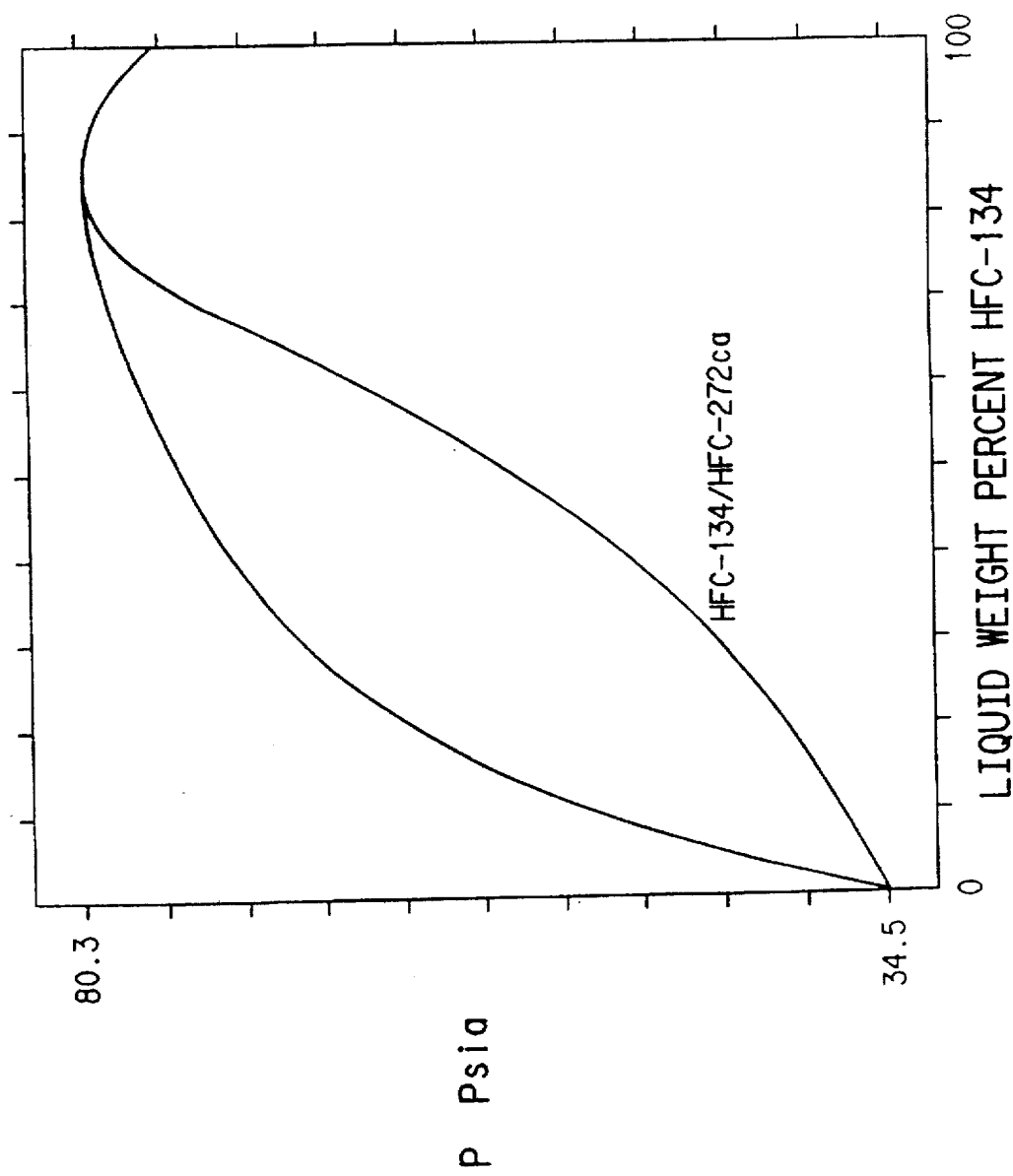
FIG. 8 is a graph of the vapor pressure of liquid mixtures of HFC-134 and HFC-272ca at 25'C.

The same procedure was used for measuring the vapor pressure of the mixtures shown in FIGS. 2 and 4–5, except that the measurements of the vapor pressure of mixtures of FIG. 4 were taken at 14.4°C and the measurements of the vapor pressure of mixtures of FIG. 5 were taken at 43.9°C.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

The compositions of the present inventions are useful as blowing agents in the production of thermoset foams, which include polyurethane and phenolic foams, and thermoplastic foams, which include polystyrene or polyolefin foams.

A polyurethane foam may be made by combining a composition of the present invention, which functions as a blowing agent, together with an isocyanate, a polyol, and appropriate catalysts or surfactants to form a poylurethane or polyisocyanurate reaction formulation. Water may be added to the formulation raction to modify the foam polymer as well as to generate carbon dioxide as an in-situ blowing agent.

A phenolic foam may be produced by combining a phenolic resin or resole, acid catalysts, a blowing agent of the present invention and appropriate surfactants to form a phenolic reaction formulation. The formulation may be chosen such that either an open cell or closed cell phenolic foam is produced.

Polystyrene or polyolefin foams may be made by extruing a molten mixure of a polymer, such as polystyrere, polyethylene or polypropylene), a nucleating agent and a blowing agent of the present invention through an extrusion die that yields the desired foam product profile.

The novel compositions of this invention, including the azeotropic or azeotrope-like compositions, may be used as cleaning agents to clean, for example, electronic circuit boards. Electronic components are soldered to circuit boards by coating the entire circuit side of the board with flux and thereafter passing the flux-coated board over preheaters and through molten solder. The flux cleans the conductive metal parts and promotes solder fusion, but leave residues on the circuit boards that must be removed with a cleaning agent. This is conventionally done by suspending a circuit board to be cleaned in a boiling sump which contains the azeotropic or azeotrope-like composition, then suspending the circuit board in a rinse sump, which contains the same azeotropic or azeotrope-like composition, and finally, for one minute in the solvent vapor above the boiling sump.

As a further example, the azeotropic mixtures of this invention can be used in cleaning processes such as described in U.S. Pat. No. 3,881,949, or as a buffing abrasive detergent.

It is desirable that the cleaning agents be azeotropic or azeotrope-like so that they do not tend to fractionate upon boiling or evaporation. This behavior is desirable because if the cleaning agent were not azeotropic or azeotrope-like, the more volatile components of the cleaning agent would preferentially evaporate, and would result in a cleaning agent with a changed composition that may become flammable and that may have less-desirable solvency properties, such as lower rosin flux solvency and lower inertness toward the electrical components being cleaned. The azeotropic character is also desirable in vapor degreasing operations because the cleaning agent is generally redistilled and employed for final rinse cleaning.

The novel compositions of this invention are also useful as fire extinguishing agents, heat transfer media, gaseous dielectrics, and power cycle working fluids.

ADDITIONAL COMPOUNDS

Other components, such as aliphatic hydrocarbons having a boiling point of −60 to +60'C, hydrofluorocarbonalkanes having a boiling point of −60 to +60'C, hydrofluoropropanes having a boiling point of between −60 to +60'C, hydrocarbon esters having a boiling point between −60 to +60'C, hydrochlorofluorocarbons having a boiling point between −60 to +60'C, hydrofluorocarbons having a boiling point of −60 to +60'C, hydrochlorocarbons having a boiling point between −60 to +60'C, chlorocarbons and perfluorinated compounds, can be added to the azeotropic or azeotrope-like compositions described above.

Additives such as lubricants, corrosion inhibitors, surfactants, stabilizers, dyes and other appropriate materials may be added to the novel compositions of the invention for a variety of purposes provides they do not have an adverse influence on the composition for its intended application. Preferred lubricants include esters having a molecular weight greater than 250.

We claim:

1. An azeotropic or azeotrope-like composition consisting essentially of 1–99 weight percent 1,1,2,2-tetrafluoroethane and 1–99 weight percent of fluoroethane, wherein the vapor pressure of said composition at 25° C. is about 77.3 to about 130.3 psia.

2. A process for producing refrigeration, comprising condensing a composition of claim 1 and thereafter evaporating said composition in the vicinity of the body to be cooled.

3. A process for producing heat comprising condensing a composition of claim 1 in the vicinity of a body to be heated, and thereafter evaporating said composition.

4. A process for cleaning a solid surface comprising treating said surface with a composition of claim 1.

5. A process of preparing a thermoset or thermoplastic foam comprising the step of foaming a mixture of the composition of claim 1 and a thermoset or thermoplastic material.

* * * * *